Oct. 23, 1928.
L. G. TRINQUART
1,688,564
COUPLING DEVICE
Filed April 19, 1923
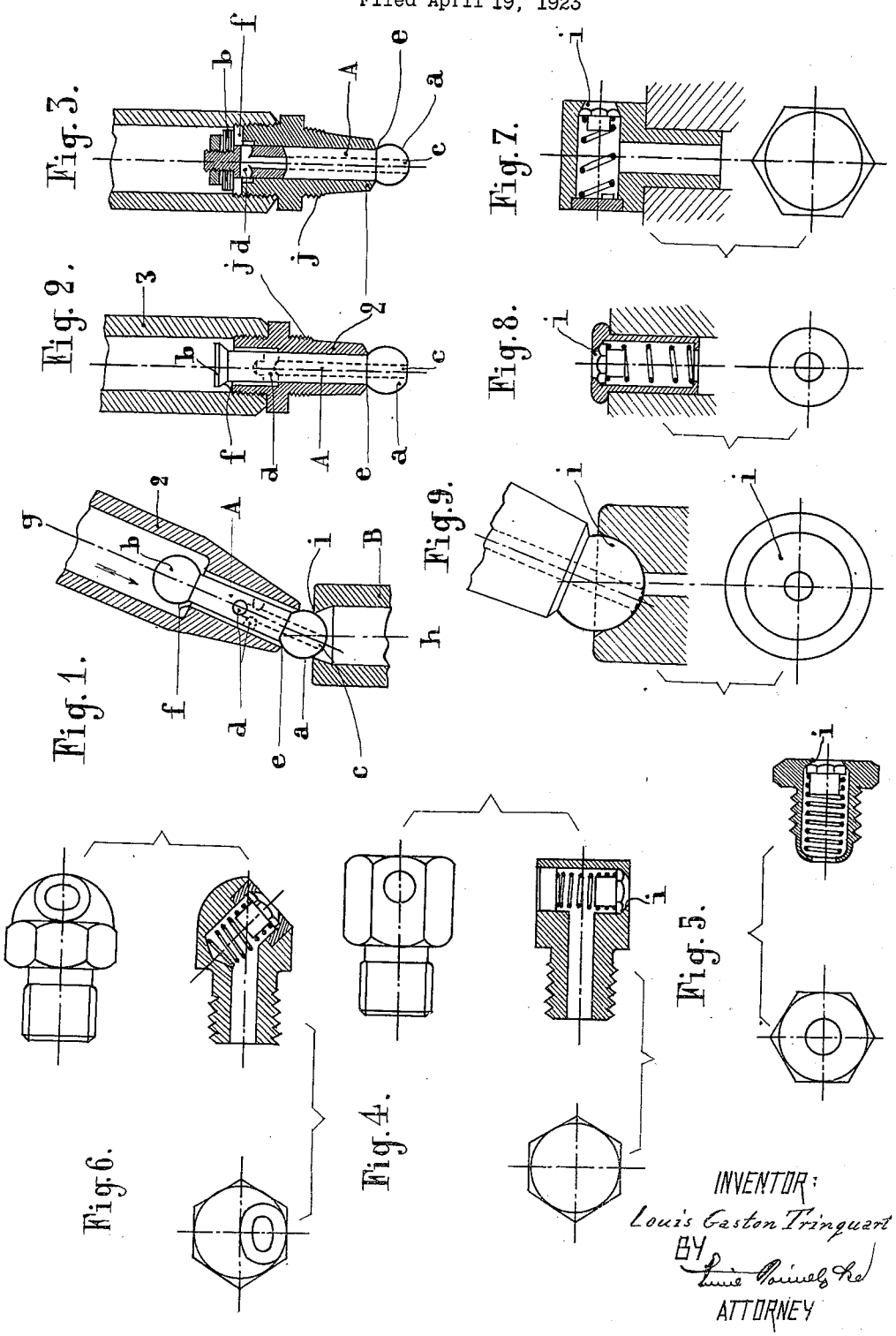
INVENTOR:
Louis Gaston Trinquart
BY
ATTORNEY Patented Oct. 23, 1928.

1,688,564

UNITED STATES PATENT OFFICE.

LOUIS GASTON TRINQUART, OF PARIS, FRANCE, ASSIGNOR TO THE BASSICK MANUFACTURING COMPANY, OF CHICAGO, ILLINOIS, A CORPORATION OF DELAWARE.

COUPLING DEVICE.

Application filed April 19, 1923, Serial No. 633,333, and in France October 25, 1922.

The object of my invention is to provide a coupling device or union operated by a mere hand pressure and permitting:

1. Communication or interruption to be established at will and instantaneously between two containers or vessels.
2. Tight union or junction.
3. Connected containers to be moved or rotated relatively to one another within limits.
4. Automatic opening of the duct or pipe once the union is made and automatic closing or stopping thereof when disconnected.

In order to make my invention more clearly understood I have illustrated, as an example, embodiments thereof in the drawings appended hereto, wherein:

Figure 1 is a general sectional view of one of the possible forms, formations or shapes, of the male and female parts coupled together.

Figures 2, 3, 4, 5, 6, 7, 8 and 9 are some of the numerous possible forms of the male and female parts.

The coupling which is the object of my invention is composed of:

1. A male part or nipple A fitted with a spherical head $a$ at its outer or coupling end and at its inner end with a spherical head $b$ constituting a valve, as will be hereinafter shown.

A channel, opening through one or several apertures $d$, at and in a suitable part of the substantially-cylindrical body of member A between heads $a$ and $b$ enables fluid to exhaust at $c$, at the end of member A.

Male member or nipple A is adapted to move freely in an axial direction within a tubular member 2 (Figures 1, 2 and 3) forming a guide and including two parts $e$—$f$ acting as valve-seats, the seat $e$ receiving the inner part of head $a$ which forms a shoulder, and the seat $f$ receiving the valve $b$.

Said tubular member 2 is provided with suitable devices to be secured to a container or to a nozzle such as 3 (Figures 2 and 3).

2. A female tubular part B comprising: a circular rib, edge or ridge $i$ adapted to embrace a portion of the spherical head $a$ of the male member in order to ensure its bearing thereon, and means to secure the same to any container or vessel.

When the above described parts are disconnected from one another, the fluid entering at $g$ is compressed and its pressure acting on valve $b$ will force part A in the direction shown by the arrow, and said valve $b$ will not permit the fluid to enter the duct or ducts $d$ (Figure 1).

But if part 2 or a member integral therewith is grasped and the spherical part $a$ thereof is pushed into $i$, part $a$ bearing on the circular rib or into the interior of the circular ridge or edge $i$, the engagement of the parts $a$ and $i$ will produce an articulated joint, and then, if the force exerted is sufficiently great, the part A will be pushed back and will open the duct or ducts $d$ to the fluid and the fluid will exhaust at $c$ into the bore $h$ of the female member B. On the other hand, the inner part of head $a$ coming to bear at $e$ on part 2 will prevent leakage on that side.

When parts 2 and B are separated, the pressure acting on the head or valve $b$ stops automatically the discharge of the fluid.

The various parts of which my apparatus is composed may be either of one-piece construction or of separate pieces connected together, and the valves as well as their seats may be modified as to shape and fitted with any suitable resilient material or substance such as rubber, leather, lead etc. while valve $b$ may be provided with a spring to hasten its closure.

Furthermore, the structure of a union according to my invention may comprise suitable devices either to enclose or to protect parts from dust or foreign matter.

I may also add any suitable stuffing-box or similar device (not shown) in order to insure a perfect tightness while the male part is being moved to its open or closed position.

I wish it to be clearly understood, that I reserve the right to introduce, make or execute all and any constructional modifications without departing from the scope of my invention.

I may, for instance, construct the female part B as the body of a valve lubricator as shown by Figures 5, 6, 7, 8 and 9, and the guide 2 may be threaded as shown at $j$ in Figures 2 and 3 to receive a threaded plug, after having been used.

The union may also be used to ensure passage of gases, of liquids, and especially of thick liquids such as grease, oil, and so on, from one container to the other.

It has an especially interesting application in the lubrication under pressure of parts of machines or motor vehicles, one of the two parts being used as a lubricator and the other one forming the end-piece of the lubricator tank outlet.

Having now particularly described and ascertained the nature of my above invention as well as the manner in which the same is to be performed or carried out, I declare that what I claim is:

1. A coupling for lubricating devices and the like, comprising a container for the material to be distributed having a longitudinal outlet passage provided with valve seats at opposite ends thereof, and a coupling member freely movable endwise in said passage and provided at its inner and outer ends with heads which are rigid therewith and adapted to fit against the respective valve seats and close the same; said member having a length sufficiently greater than that of said passage to enable one head to be unseated when the other is seated, and a diameter sufficiently less than that of the passage to provide an annular space between the walls of the said member and passage for the discharge of the material therethrough when the inner head is unseated, and also having an axial bore which opens laterally at its inner end through the wall of said member into said space to enable the material to flow into said bore from said space, and which opens at its outer end through the outer head; combined with a tubular receiving member having an annular edge to receive the outer head of the coupling member and form a liquid-tight joint therewith while permitting relative rotation and inclination between said members.

2. A coupling for lubricating devices and the like, comprising a container for the liquid having a longitudinal outlet passage provided with valve seats at opposite ends thereof, and a coupling member freely movable endwise in said passage and provided at its inner and outer ends with heads which are rigid therewith and adapted to fit against the respective valve seats and close the same, the outer head being spherical; said member having a length sufficiently greater than that of said passage to enable one head to be unseated when the other is seated, and a diameter sufficiently less than that of the passage to provide an annular space between the walls of the said member and passage for the discharge of the material therethrough when the inner head is unseated, and also having an axial bore which opens laterally at its inner end through the wall of said member into said space to enable the material to flow into said bore from said space, and which opens at its outer end diametrically through the spherical outer head; combined with a tubular receiving member having an annular edge with a substantially concave wall to receive the spherical outer head of the coupling member and form a liquid-tight joint therewith while permitting relative rotation and inclination between said members.

3. A coupling, according to claim 1, in which both heads of the coupling member are integral with the body of said member and are of spherical form, and in which the axial bore extends diametrically through the outer head and opens at its inner end through the central portion of the body; substantially as described.

4. A coupling for lubricating devices and the like, comprising a container for the material to be distributed having an outlet passage provided with outer and inner valve seats at opposite ends thereof, an end-piece slidable freely in said passage and having its outer end projecting beyond the same and adapted to fit against the outer seat, and means disposed within the container and connected to said end-piece to occupy the inner seat and thereby close said passage; combined with a receiving member having an inlet wherein the projecting outer end of the end-piece is adapted to engage; said container and its end-piece adapted to be pressed against said inlet to effect a movement of the internal closing means away from said inner seat to open the passage and enable the material to pass into the receiving member.

5. A coupling for lubricating devices and the like comprising a container for the material to be distributed having an outlet passage provided with outer and inner valve seats at opposite ends thereof, an end-piece slidable freely in said passage and having its outer end projecting beyond the same and adapted to fit against the outer seat, and means disposed within the container and connected to the inner end of the end-piece to occupy the inner seat and thereby close said passage, said end-piece having a length sufficiently greater than the passage to unseat the internal closing means when the outer end of the end-piece is seated, and vice versa; combined with a receiving member having an inlet wherein the projecting outer end of the end-piece is adapted to engage; said container and its end-piece adapted to be pressed against said inlet to effect a movement of the internal closing means away from said inner seat to open the passage and enable the material to pass into the receiving member.

In testimony whereof I affix my signature.

LOUIS GASTON TRINQUART.